Nov. 3, 1925.
H. B. BERNARD
GASOLINE RECOVERY
Filed May 27, 1924
1,560,138
2 Sheets-Sheet 1
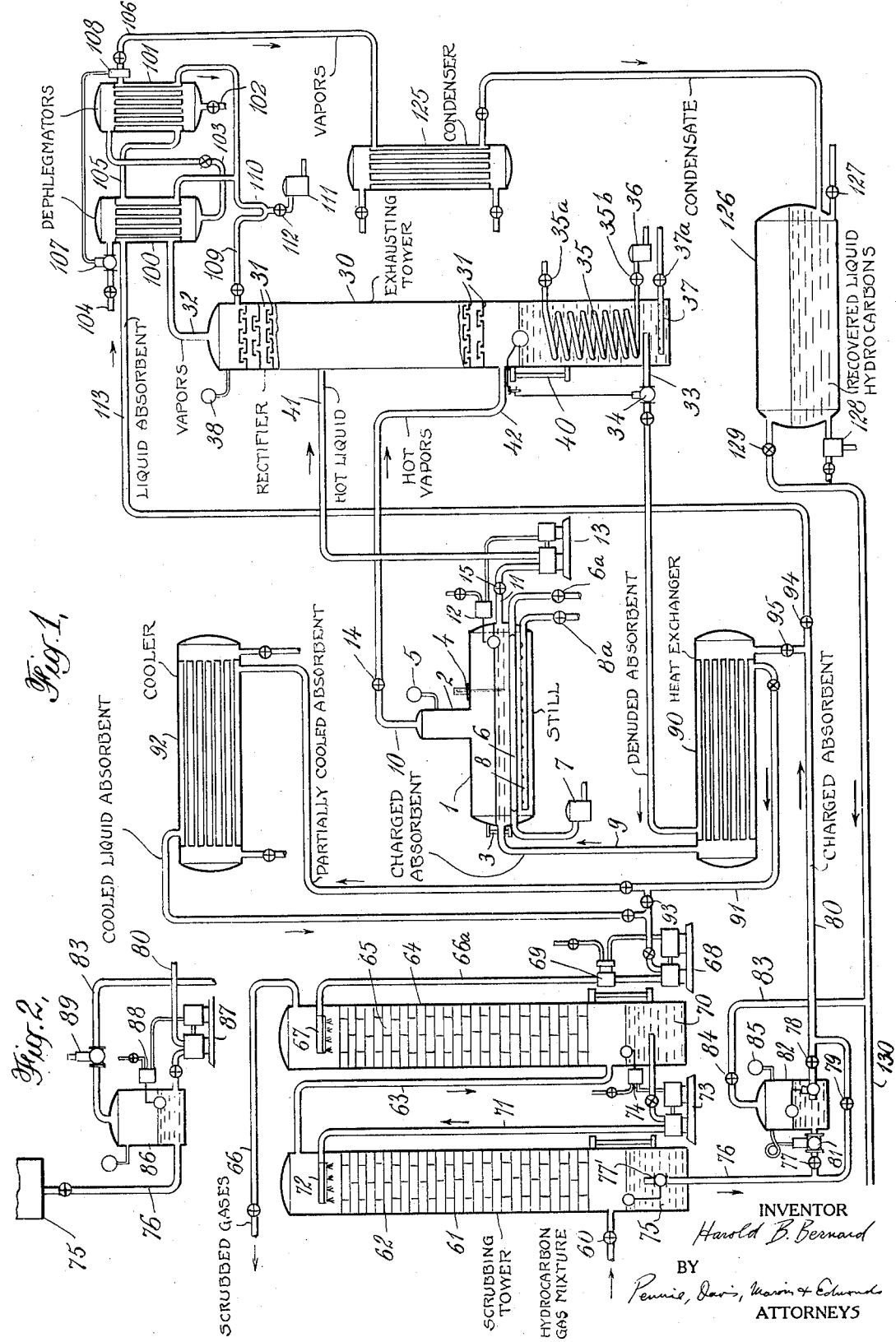
INVENTOR
Harold B. Bernard
BY
Pennie, Davis, Marvin & Edmonds
ATTORNEYS

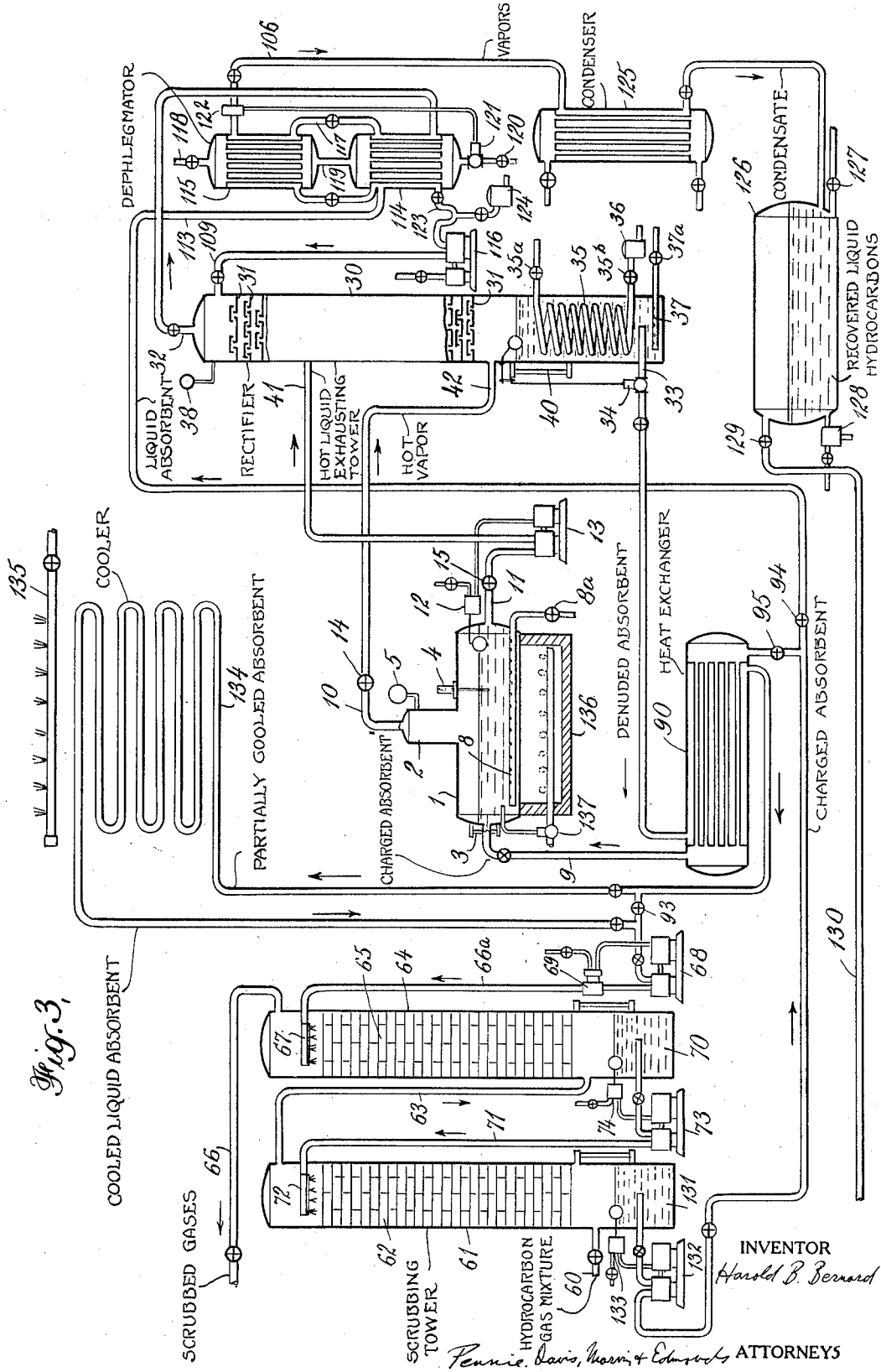

Patented Nov. 3, 1925.

1,560,138

UNITED STATES PATENT OFFICE.

HAROLD B. BERNARD, OF TULSA, OKLAHOMA, ASSIGNOR TO SINCLAIR OIL AND GAS COMPANY, OF TULSA, OKLAHOMA, A CORPORATION OF MAINE.

GASOLINE RECOVERY.

Application filed May 27, 1924. Serial No. 716,129.

*To all whom it may concern:*

Be it known that I, HAROLD B. BERNARD, a citizen of the United States, residing at Tulsa, Oklahoma, in the county of Tulsa, State of Oklahoma, have invented certain new and useful Improvements in Gasoline Recovery; and I do hereby declare the following to be a full, clear, and exact description of the invention, such as will enable others skilled in the art to which it appertains to make and use the same.

This invention relates to the recovery from natural gas and casinghead gas of liquid mixtures of hydrocarbons of the type commonly known as natural gas gasoline, natural gasoline, and casinghead gasoline. These liquid hydrocarbon mixtures are of a light gasoline character and are particularly adapted for use in blended motor fuels in admixture with heavier hydrocarbons.

Among the objects of the invention are the provision of improved processes and apparatus for the recovery of such hydrocarbons and the improvement of the hydrocarbon products obtained.

More particularly, this invention relates to an improved method and apparatus for use in the recovery of natural gas gasoline and the like by absorption in a liquid absorbing medium, and to an improved method and apparatus for separating the absorbed vapors from the liquid absorbent; and the invention includes improvements in the separation of absorbed gasoline and improvements in the complete process.

Briefly, in recovering natural gas gasoline from natural gas, or similar gaseous mixtures, by absorption in a liquid menstruum, the natural gas is subjected to treatment with a liquid absorbent capable of selectively dissolving or entraining the gasoline constituents, the stripped gas and the absorbent charged with gasoline are separated, the absorbed gasoline, or as great a part as possible or practicable, is distilled from the absorbent, the denuded absorbent is cooled and returned for further treatment of an additional quantity of natural gas, and the separated gasoline is condensed and collected.

According to the present invention, the liquid absorbent employed in extraction of the gasoline content from the natural gas is treated to effect a more complete separation or stripping of the absorbed gasoline from the absorbing medium; and the efficiency of the entire operation, including the absorption of the gasoline from the natural gas and the separation of the absorbed gasoline from the absorbing medium, are improved. Rectification of the separated gasoline to separate admixed absorbent may, with advantage, be combined with the distillation treatment for separating the gasoline from the absorbing medium.

According to the process of the present invention, the liquid absorbent charged with absorbed gasoline following the absorption treatment is preheated or subjected to a preliminary distillation treatment and the liquid from the preliminary distillation treatment while hot is then passed in counter current flow and in direct contact with the hot gases and vapors separated in the preliminary distillation treatment.

In treating natural gas or casinghead gas with a cool liquid absorbent, a part of the very light constituents of the gas, incondensible at ordinary temperatures and pressures, are absorbed together with the gasoline vapors in the liquid absorbent. These light incondensible constituents may be absorbed in amount even as great or greater than the gasoline constituents. When the charged absorbent is heated to a temperature sufficient to vaporize the absorbed gasoline constituents, these light constituents are likewise set free. In general, the light constituents are retained by the absorbent less strongly than the heavier constituents, so that the tendency, particularly at lower temperatures, is toward a greater relative separation of the lighter constituents, if the stripping is not pushed to completion. The amount of light incondensible gases may be very much increased where the absorption is carried out under higher presures, and in this case, a large part of the absorbed gases may be set free upon the reduction of pressure before any application of heat. According to the present invention, these absorbed gases are employed to assist in effecting an improved separation of the absorbed gasoline constituents from the absorbing medium.

In the preliminary distillation treatment of the present invention, a preliminary separation of the absorbed constituents and the absorbing medium is effected. Sufficient heat may be applied to separate all of the absorbed gasoline constituents, although this may not be necessary where additional heat is supplied in subsequent treatment. The separated vapors and gases from the preliminary distillation treatment may include, however, entrained or partially vaporized absorbent in small amounts, and the liquid from the preliminary distillation treatment may include unvaporized quantities of the absorbed gasoline constituents.

The hot liquid is then passed in counter current flow and in direct contact with the hot vapors and gases separated in the preliminary distillation treatment. The most completely stripped absorbent is thus contacted with the hot vapors and gases fresh from the preliminary distillation before they contact with more incompletely denuded absorbent, and the vapors and gases are then passed in further contact with the less completely denuded absorbent. At the relatively high temperature prevailing in the exhausting treatment, and the absorbing capacity of the lightest vapors and gases separated in the preliminary distillation is relatively high and the absorbent tends to give up any remaining absorbed gasoline constituents. At the relatively high temperature, the absorbed gases, and absorbed vapors lighter than the desired gasoline constituents, are thus employed as an absorbent for recovering any remaining absorbed gasoline constituents from the liquid absorbent. The exhausting treatment also assists in removing any vaporized or entrained liquid absorbent.

Additional heat may also be applied during the exhausting treatment. The concentration, and the partial pressure effect, of the incondensible gases from the preliminary distillation may also be increased by the introduction, into the exhausting treatment directly or through the distillation treatment, of additional quantities of incondensible gas such as stripped gas from the absorbing treatment. Heat may also be supplied by introducing this gas in a heated condition. Where incondensible gases are so employed, the quantity of gas used is relatively small with reference to the total amount of gas subjected to the absorbing treatment, so that even though the vaporized gasoline constituents are thereby somewhat diluted, a relatively high concentration of the gasoline constituents is effected.

The gases and vapors separated from the liquid absorbent by the distillation and exhausting treatments may be subjected to a rectification treatment following the exhausting treatment for further removal of any vaporized or entrained liquid absorbent. Before final condensation, the rectified vapors may also be subjected to dephlegmation and the dephlegmate return or refluxed to the rectification treatment and the exhausting treatment. Dephlegmation may be controlled and in part effected by the direct introduction into the vapors and gases undergoing dephlegmation of a regulated part of the gasoline-charged liquid absorbent. The heat exchange in the dephlegmation tends to vaporize the absorbent gasoline, and where the dephlegmate, in this case including the absorbing menstruum, is returned to the rectification or exhausting treatment, the further removal of any retained gasoline constituents is effected in these latter treatments. This mode of operation is of advantage where a somewhat broader final gasoline fraction is desired.

The process of the invention can be practiced in various forms of apparatus. Essentially, the apparatus of the invention comprises a preliminary still, a receptacle through which the liquid residuum from the preliminary still is passed in counter current flow and in direct contact with the vapors and gases from the preliminary still for exhausting the liquid residuum and appropriate connections between this receptacle and the preliminary still.

The preliminary still may be a still of ordinary construction and may be heated by direct fire or by submerged steam coils or by flues through which heating gases are passed. In practice, a horizontal fire tube boiler can be employed although requiring a closer regulation of the liquid level than a shell or liquid tube type of still. Connections may also be provided for the direct introduction of steam or gas into the liquid charge. Automatic or semi-automatic means may also be employed for controlling the temperature and the liquid level.

The exhausting column may be a bubble tower or baffle tower of conventional construction or a helical tower of the type described in the application of John E. Bell filed April 1, 1924. Serial No. 703,338 or other tower of similar function adapted to promote intimate contact and heat exchange between downwardly flowing liquid and upwardly flowing vapors and gases. Connections are provided for discharging the liquid residuum from the still into the upper part of this column and the vapors and gases from the still into the lower part of this column. Where the point of introduction of the liquid residuum into the exhausting column is above the liquid level in the still, these connections may include a pump or other liquid forcing means. By arranging the inlet connection for the liquid residuum spaced below the top of the tower, the upper part of the tower above this inlet connection can be employed as a rectifier for the separated gasoline constituents. The vapors and gases containing the separated gasoline are withdrawn from the top of the exhausting tower, and the denuded liquid absorbent collects in the lower end of the tower, from which it is withdrawn for further use.

The upper end of the exhausting tower may be provided with cooling coils or other cooling surfaces and the dephlegmation effected within the upper end of the tower, or the vapors and gases escaping from the upper end of the tower may be conducted through one or more cooled vessels before being subjected to final condensation. Where a separate dephlegmating vessel is employed, the dephlegmate can be returned to the rectifying section of the tower, that is the section above the hot liquid residuum inlet, to assist in the rectification therein. A valved connection may also be provided for introducing a regulated part of the gasoline charged menstruum into direct contact with the vapors and gases in one or more of the dephlegmators to assist or to regulate the dephlegmation.

The invention will be further described in connection with the accompanying drawings illustrating embodiments of the apparatus of the invention adapted for use in practicing the process of the invention; but it is intended and will be understood that the invention is illustrated, not limited, by this further description and illustration.

In the accompanying drawings:

Fig. 1 diagrammatically represents in elevation and partly in section a system for gasoline recovery embodying the invention and adapted for carrying out the invention.

Fig. 2 is a modified form of one of the elements of the system illustrated in Fig. 1, and Fig. 3 diagrammatically represents in elevation and partly in section a somewhat modified system for gasoline recovery embodying the invention and adapted for carrying out the invention.

The drawings diagrammatically illustrate a complete system embodying the invention for recovering gasoline from natural gas or casinghead gas in accordance with the process of the invention. In carrying out the process of the invention in the apparatus of the type illustrated, the natural gas of casinghead gas containing the gasoline to be absorbed is passed through absorbing towers wherein it is contacted with the cooled liquid absorbent, the charged absorbent is passed through a heat exchanger to a still in which an initial separation of gases and vapors is effected, the separated gases and vapors and the liquid residuum are passed in countercurrent and in direct contact in an exhausting column in which the absorbent is substantially completely removed, the denuded absorbent is circulated through the heat exchanger giving up a part of its heat to the charged absorbent entering the still and after further cooling, if necessary, is returned to the absorbers, the vapors and gases separated form the absorbent in the exhausting column are passed through a rectifier and thence through one or more dephlegmators, any dephlegmate is returned to the rectifier and exhausting column, and the final gasoline fraction escaping from the dephlegmators as a vapor is condensed and collected.

Referring to Fig. 1, the natural gas or casing head gas containing the gasoline vapors is introduced through connection 60 into the lower part of the first absorbing tower 61, passed upwardly through baffles or filling material 62, conducted from the top of the first tower to the lower part of the second absorbing tower 64 through connection 63 and passed upwardly through baffles or filling material 65 therein, and the stripped gas is exhausted from the upper end of the second tower through connection 66. The fresh liquid absorbing medium is introduced into the top of the second absorbing tower through connection 66ª and sprayhead 67 by means of pump 68. A governor 69 is provided actuated by a flow-rate mechanism in the connection 66 for controlling the operation of the pump 68 so as to maintain a constant rate of flow of the liquid absorbing medium. In the absorbing tower 64, the liquid absorbent is distributed over the filling material through the sprayhead and is passed downwardly in direct contact and in countercurrent flow with the ascending partially stripped gas from the first absorbing tower. The partially charged absorbent collects in the liquid reservoir 70 in the lower part of the tower 64 and is introduced into the top of the first tower through connection 71 and sprayhead 72 by means of pump 73. A float actuated governor 74 is provided for controlling the operation of the pump 73 to maintain the liquid level in the reservoir 70, above the outlet connection to the pump 73 and below the gas inlet of connection 63. In the tower 61 the partially charged absorbent is passed downwardly in countercurrent flow and in direct contact with the ascending fresh gas. The charged absorbent collects in the liquid reservoir 75 in the lower part of the tower 61. From the reservoir 75 the charged absorbent is discharged through connection 76 in which a flow actuated valve 77 is interposed for maintaining the liquid level in the reservoir below the gas inlet and above the liquid outlet.

Where the pressure prevailing in the absorbing towers is sufficient to force the charged absorbent through the heat exchanger 90 into the still 1, the valves 77 and 78 can be closed and the valve 79 opened, the charged absorbent being discharged directly from the liquid reservoir 75 through connection 80. Where a high pressure prevails in the absorbers the valve 79 can be closed and the valves 77 and 78 can be opened and the charged absorbent passed through the reducing valve 81 and the vent tank 82 where the pressure is reduced to the desired value and the liquid absorbent discharged through connection 80, any separated gases and vapors being withdrawn through connection 83, the withdrawal being regulated by means of valve 84. The vent tank may be provided with a level gauge to assist in regulating the withdrawal of vapors and gases and a pressure gauge 85 to assist in regulating the pressure reduction.

In place of the arrangement of the vent tank and the expansion valve illustrated in Fig. 1 the arrangement of vent tank and expansion valve illustrated in Fig. 2 may be substituted.

Referring to Fig. 2, the charged absorbent from the reservoir 75 is discharged directly into the vent tank 86 through connection 76. The charged absorbent is withdrawn from the vent tank by means of a pump 87, which acts as a reducing valve, and which is controlled by a float actuated governor 88. An expansion valve 89 in the vent connection 83 serves to reduce the pressure upon any vapors and gases liberated within the vent tank 86.

Where a vent tank is employed, as in Fig. 1 or to a lesser extent as in Fig. 2, some of the lightest vapors and gases are liberated from the absorbent upon the reduction of pressure. In practicing the present invention, the light vapors and gases, other than the absorbed gasoline constituents, are employed in effecting the separation of the absorbed gasoline constituents from the liquid absorbent, and except where the absorption treatment is effected under very high pressure and a relatively large proportion of incondensible gases are absorbed, it is generally desirable to conduct all of the gases and vapors absorbed in the absorption treatment through the distillation treatment and the exhausting treatment. Direct valve control of the pressure reduction, where a higher pressure is employed in the absorbers than prevails in the distillation and exhausting treatments, is usually desirable and satisfactory.

The heat exchanger 90 is of the shell and tube type. The charged absorbent passing to the still through connection 80 is circulated through the tubes. The denuded absorbent from the exhausting column is circulated about the tubes and is discharged through connection 91. The denuded absorbent escaping from the heat exchanger 90 is circulated through the cooler 92 on its way to the pump 68. Where the cooling effected in the heat exchanger 90 is sufficient or where it is desirable to limit the degree of extraction effected in the absorbers, as to prevent or reduce the extraction of the lighter vapors and gases, all or a part of the absorbent leaving the heat exchanger 90 may be by-passed around the cooler 92 through valved connection 93. From the heat exchanger 90 the charged absorbent is introduced into the still 1 through connection 9.

The preliminary still comprises a shell 1 having a vapor dome 2 and is provided with the usual accessories including a level gauge 3, a thermometer 4 and a pressure gauge 5. A steam coil 6, connected on its discharge end with a steam trap 7, is provided below the normal liquid level for heating the contents of the still, and a perforated pipe 8 extending along the bottom of the shell is provided for introducing steam or gas directly into the charge in the still. Valves 6$^a$ and 8$^a$ are provided for controlling the steam coil 6 and the injection pipe 8 respectively. The vapors and gases separated from the liquid absorbent in the still escape therefrom through connection 10 and the hot liquid residuum is withdrawn through connection 11.

The exhausting column illustrated is of bubble tower construction and comprises a vertical shell 30 having an extended series of bubble plates 31 therein and is arranged with a liquid reservoir in the lower end. The liquid from the preliminary still is introduced into tower through connection 41 having its inlet into the tower at a point somewhat below the uppermost bubble plate in the tower. The liquid residuum from the still is withdrawn through connection 11 and forced into the tower through connection 41 by means of pump 13. A float actuated governor 12 is provided for controlling the operation of the pump 13 and for maintaining the liquid level in the still. The vapors and gases from the preliminary still are introduced into the tower through connection 42, connected to the outlet 10 of the vapor dome of the still 1, having its inlet into the tower below the lowermost bubble plate. Valves 14 and 15 are interposed in the connections 10 and 11 respectively for regulating, or for supplementing the regulation, of the flow of vapors and gases and the liquid from the still to the exhausting tower.

The space within the exhausting tower between the connections 41 and 42 thus serves as an exhausting receptacle and the space above the connection 41 as a rectifying receptacle. The gasoline containing vapors from the rectifier escape through connection 32 and the denuded absorbent is withdrawn through connection 33. A float actuated valve 34 is provided in the outlet 33 to maintain the level in the liquid reservoir at the base of the tower below the gas and vapor inlet 42 and above the outlet 33. A steam coil 35 for supplying additional heat is provided in the lower part of the tower. The steam coil is controlled by valves 35<sup>a</sup> and 35<sup>b</sup> and is connected on its outlet end with steam trap 36. A perforated pipe 37 is also provided in the base of the tower for the direct introduction of steam or gas. Pressure gauge 38 is provided for indicating the pressure in the tower and a level gauge 40 is provided for indicating the liquid level in the reservoir at the base of the tower.

The exhausting column 30 and the vapor and gas and the liquid connections between the still and the exhausting column are heat insulated or lagged to maintain the temperature of vapors and gases and the liquid separated in the preliminary still and to prevent heat loss. With short connections and with sufficiently rapid flow from the still to the exhausting column, the heat insulation may in some cases be dispensed with, or sufficient additional heat may be supplied to the column, as by passing steam through the coil 35 or by introducing steam or hot gas through the perforated pipe 37, to make up for any heat losses entailed. In any case, heat insulation is desirable to eliminate unnecessary heat loss.

The hot liquid absorbent from the preliminary still, including any absorbed constituents remaining unvaporized after the preliminary distillation treatment, is introduced into the upper part of the exhausting column by means of the pump 13 and the hot vaporized constituents are introduced into the lower part of the column 30. The hot vapors and gases bubble upwardly through the descending liquid in the exhausting column, tending to give up to the liquid any vaporized or entrained absorbent, and absorbing from the liquid absorbent any remaining absorbed gasoline constituents. The denuded absorbent is returned from the reservoir in the lower part of the tower through the heat exchanger 90, and the cooler 92, to the absorbing tower. The vapors and gases separated from the liquid absorbent pass upwardly through the upper section of the tower 30 above the inlet of the connection 41 and undergo rectification therein, the uncondensed vapors and gases escaping to the dephlegmators through connection 32.

Two dephlegmators, 100 and 101, of the shell and tube type are shown in Fig. 1, connected in series with respect to both the cooling fluid and the vapors and gases undergoing dephlegmation, but one or a greater number of dephlegmators of this or other construction may be employed. The cooling fluid enters the second dephlegmator 101 through connection 102, passes through the tubes therein to the first dephlegmator 100 through connection 103, and escapes therefrom through connection 104. The vapors and gases enter the first dephlegmator through connection 32, pass about the tubes therein to the second dephlegmator through connection 105, and escape from the second dephlegmator through connection 106. A thermostatically operated valve 107 is provided in the cooling fluid outlet 104 actuated by the thermostat 108 in the vapor outlet 106 for controlling the cooling and condensation within the dephlegmators. From the dephlegmators any condensate is returned to the upper part of the rectifying section of the column 30 through connection 109 having a liquid seal trap 110 therein. A trap 111 is connected to the lowest point of the seal 110 for removing any water condensed in the dephlegmators where direct steam is employed in the preheater or exhausting column. Where the removal of water at this point is not desired, the valve 112 is closed disconnecting the trap. The reflux returned to the rectifying section of the tower 30 assists in the rectification, and the character of the final product can, within limits, be controlled by regulation of the character and quantity of reflux. The character and quantity of reflux from the dephlegmators can be controlled by regulation of the temperature and amount of cooling fluid circulated therethrough.

The dephlegmation in the dephlegmators 100 and 101 can also be controlled and in part effected by the introduction into the dephlegmators of a regulated amount of gasoline charged absorbent. In Fig. 1, a connection 113 is shown for by-passing a part of the gasoline charged absorbent from the absorbers 61 and 64 from connection 80 into the first dephlegmator 100. Regulation of the amount of gasoline charged menstruum so introduced into the first dephlegmator is effected by adjustment of valves 94 and 95. The absorbent and any unvaporized part of the absorbed constituents, after passing through the dephlegmator, is returned to the tower 30 with the reflux, and in passing through the tower is stripped of any remaining absorbed gasoline. This stripped absorbent also collects in the reservoir at the base of the tower and is returned to the absorbers through connection 33.

The vapors escaping through the connection 106 pass through the condenser 125, shown of the shell and tube type, and the condensate is collected in the receiving drum 126. The finished gasoline product is withdrawn through the valved outlet 127; or where direct steam is employed and the condensate in the drum 126 includes some water, the gasoline product may be withdrawn through the separating trap 128. Any vapors and gases collecting in the receiver are withdrawn through the valved outlet 129, escaping through connection 130.

The apparatus illustrated in Fig. 3 is in several respects sufficiently similar to that shown and described in Fig. 1 so that a separate description is unnecessary with respect to these corresponding features.

As in Fig. 1, the natural gas or casinghead gas enters the first absorbing tower through connection 60 and the stripped gas leaves the second absorbing tower through connection 66. Excepting the means for removing the charged absorbent from the first tower, the operation and construction of these towers and the absorbent circulating pumps are the same as has been described in connection with Fig. 1.

The construction illustrated in Fig. 3 is particularly adapted for carrying out the absorption under relatively low pressure, including pressures lower than the pressure in the still. The gasoline charged absorbent collects in the reservoir 131 in the lower part of the first tower 61 and is withdrawn therefrom by means of pump 132. A float actuated governor 133 is provided for controlling the operation of the pump 132 to maintain the liquid level in the reservoir 131 above the outlet connection to the pump 132 and below the gas inlet of connection 60. The pump 132 forces the gasoline charged menstruum through the heat exchanger 90 into the still 1.

In place of a cooler of the shell and tube type, as illustrated at 92 in Fig. 1, an atmospheric cooling coil 134 over which water or other cooling fluid is distributed from perforated pipe 135 is provided for cooling the returned denuded absorbing medium. An atmospheric cooler is of advantage where cooling water of satisfactory quality for use in a shell and tube type cooler is not readily available or where it is desirable to supplement the cooling action of the sensible heat of the cooling water by the heat of evaporation of part of the water. Likewise, an atmospheric cooler of condenser may be used in place of or as a supplementary cooler in connection with the condenser 125.

The still 1 is heated over a gas or oil fired furnace 136 and a thermostatically operated valve 137 is provided for regulating the temperature in the preliminary still by controlling the rate of combustion in the furnace.

In the apparatus illustrated in Fig. 1, the dephlegmators 100 and 101 are arranged to provide for return of the dephlegmate to the tower 30 by gravity. In the apparatus illustrated in Fig. 3, the dephlegmate is returned to the tower 30 by means of a pump 116. The vapors and gases from the tower 30 enter the first dephlegmator 114 through connection 32, pass about the tubes therein to the second dephlegmator 115 through connection 117, and escape from the second dephlegmator through connection 106. The cooling fluid enters the second dephlegmator through connection 118, passes through the tubes therein to the first dephlegmator through connection 119, and escapes therefrom through connection 120, flowing through the dephlegmators in countercurrent to the flow of vapors and gases. A thermostatically operated valve 121, in the cooling fluid outlet 120 and actuated by the thermostat 122 in the vapor outlet 106, is provided for controlling the cooling and condensation within the dephlegmators. The dephlegmate collecting in the lower part of the space about the tubes in the lower dephlegmator 114 is withdrawn through connection 123 and forced into the upper part of the tower 30 through connection 109 by means of pump 116. A trap 124, connected to the connection 123 through a valve, is provided for removing any water condensed in the dephlegmators where direct steam is employed in the preheater or exhausting column. Valve controlled connection 113 is provided for introducing gasoline charged absorbent into the lower dephlegmator, the menstruum and any unvaporized absorbed constituents of any absorbent so introduced being returned to the tower 30 by means of pump 116 with the dephlegmate.

In operation, the natural gas or casinghead gas is first contacted with a liquid absorbent in amount sufficient to remove the major part of the gasoline content of the gas. Suitable liquid absorbents comprise naphtha, kerosene, gas oil, straw oil, light lubricating oil, mineral seal oil and cresol. A ratio of about 20 parts of liquid absorbent per part of gasoline to be recovered can be used, although this ratio may be decreased with liquid absorbents having a higher absorptive capacity, such as the lighter hydrocarbon absorbents. The proportion of the gasoline recovered can be increased by increasing the ratio of the amount of absorbent used to the amount of gasoline recovery, by lowering the temperature of the liquid absorbent, or by increasing the pressure in the absorbing treatment. The use of an increased amount of liquid absorbent is in general to be avoided since it entails the handling and heating and cooling of larger quantities of absorbent in the cycle of the process. In general, relatively higher pressures are employed during absorption in the treatment of a lean gas and relatively lower pressures in the treatment of a rich gas.

The gasoline charged absorbent from the absorbers is continuously introduced into the preliminary still where an initial separation of the absorbed vapors and gases is effected. Where heat is applied only in the preheater, the amount of heat introduced should be sufficient to vaporize all the gasoline content from the absorbent and to make up for any heat losses. Where heat is applied at other points, as in the exhausting column, the amount of heat introduced in the preliminary distillation may be somewhat reduced. The separation in the preliminary distillation may be effected at a somewhat lower temperature by the direct introduction of steam or gas, and where gas is employed, all or a part of the heat required in the preliminary distillation treatment may be introduced by heating the gas before introduction.

In the exhausting column, the descending heated liquid residuum is directly contacted in countercurrent flow with the ascending hot vapors and gases and the liquid absorbent is substantially completely denuded of its remaining content of absorbed gasoline and the liquid absorbent assists in separating from the vapors and gases any entrained or vaporized absorbent. In the section of the tower above the liquid residuum inlet, the separated vapors containing the gasoline are subjected to rectification and a further separation of any entrained or vaporized absorbent is effected.

If additional heat is required to complete the stripping of the absorbent in the exhausting tower, steam is supplied to the heating coil in the base of the tower or steam or hot gas is introduced through the exhausting tower. In the drawing the perforated pipe for the introduction of steam or gas is shown at the lower part of the liquid reservoir at the base of the exhaustion column and steam or gas discharged therethrough bubbles up through the liquid absorbent collecting in the reservoir. This inlet for steam or gas may also be arranged above the liquid level in the reservoir and directly introduced steam or gas passed upwardly through the exhausting column with the vapors and gases from the preheater without being bubbled up through the absorbent in the reservoir.

To assist in the vaporization in the exhausting tower of any remaining absorbed gasoline constituents, a light or incondensable gas, such as the tail gases from the absorbers or the tail gases from the recompression treatment referred to below, may be introduced and circulated with the vapors and gases separated in the preliminary distillation upwardly through the exhausting tower. Additional light gas, for this purpose, may be introduced through the charge in the preliminary still or may be directly introduced into the exhausting column. Where the gas is introduced directly into the exhausting column, it is advantageously introduced in a heated state to increase the absorptive capacity of the gas for any remaining absorbed gasoline constituents.

After escaping from the rectifier in the upper end of the column 30, the gases and vapors separated from the liquid absorbent are subjected to dephlegmation, any dephlegmate is returned to the tower 30, and the vapors and gases from the dephlegmators are passed through the condenser 125 to the receiving drum 126. The gases and vapors collecting or liberated in the receiver for the condensed gasoline product may be withdrawn through connection 130, together with the vent gases from the vent tank where such a vent tank is employed in reducing the pressure between the absorbers and preheater, and subjected to recompression for the recovery of their gasoline content. Where additional incondensable gas in introduced for effecting the separation of the absorbed gasoline constituents from the liquid absorbent, an increased amount of gases and vapors carrying an increased amount of recoverable gasoline tends to collect or become liberated in the receiving drum. The amount of gasoline separating as a vapor in the receiver may be reduced by increasing the pressure in the receiver or by increasing the cooling in the condenser 125. In general, however, the gases and vapors withdrawn from the receiver are sufficiently rich in recoverable gasoline to be well adapted to treatment by recompression.

Sufficient pressure may be maintained in the preliminary still and in the exhausting tower for circulating the vapors and gases through the rest of the system to the receiver. The pressure maintained depends, in part, upon the pressure maintained in the receiver, and where a relatively high pressure is employed in the receiver, the pressure in the still and exhausting column may be substantially in excess of atmospheric pressure.

The entire apparatus can be and preferably is heat insulated or lagged to prevent heat loss. To assist in regulation of the operation, a thermometer or other temperature indicating device can be arranged in the gas inlets and outlets and absorbent inlets and outlets in the absorbers, on the inlets and outlets of the heat exchangers and the absorbent coolers, on the vapor and gas and the liquid outlets from the preheater, on the exhausting column inlets from the preheater and in the vapor outlet and liquid reservoir in the preheater, on the cooling fluid connections, the vapor inlets and outlets and the reflux return line of the dephlegmators, and on the condenser for the final gasoline product.

I claim:

1. A process of recovering gasoline from natural gas, casinghead gas, and the like, which comprises subjecting the gas to an absorption treatment with a liquid absorbing medium, subjecting the charged medium from the absorption treatment to a preliminary distillation treatment by the application of heat, and passing the liquid from the distillation treatment while hot in counter current flow and in direct contact with the distilled vapors and gases from the distillation treatment.

2. A process of recovering gasoline from natural gas, casinghead gas, and the like, which comprises subjecting the gas to an absorption treatment with a liquid absorbing medium, subjecting the charged medium from the absorption treatment to a preliminary distillation treatment by the application of heat, passing the liquid from the distillation treatment while hot in countercurrent flow and in direct contact with the distilled vapors and gases from the distillation treatment, and subjecting the vapors and gases from the last mentioned treatment to a rectification treatment.

3. A process of recovering gasoline from natural gas, casinghead gas, and the like, which comprises subjecting the gas to an absorption treatment with a liquid absorbing medium, subjecting the charged medium from the absorption treatment to a preliminary distillation treatment by the application of heat, passing the liquid from the distillation treatment while hot in countercurrent flow and in direct contact with the distilled vapors and gases, and diluting the vapors and gases directly contacted with the liquid from the distillation treatment in countercurrent flow with gas lighter than the gasoline constituents.

4. A process of recovering gasoline from natural gas, casinghead gas, and the like, which comprises subjecting the gas to an absorption treatment with a liquid absorbing medium, subjecting the charged medium from the absorption treatment to a preliminary distillation treatment by the application of heat, passing the liquid from the distillation treatment while hot in countercurrent flow and in direct contact with the distilled vapors and gases, and passing additional light gas through the last mentioned treatment with the distilled vapors and gases.

5. A process of recovering gasoline from natural gas, casinghead gas, and the like, which comprises subjecting the gas to an absorption treatment with a liquid absorbing medium, subjecting the charged medium from the absorption treatment to a preliminary distillation treatment by the application of heat, introducing light gas into the distillation treatment, and passing the liquid from the distillation treatment while hot in countercurrent flow and in direct contact with the vapors and gases from the preliminary distillation treatment.

6. A process of recovering gasoline from natural gas, casinghead gas, and the like, which comprises subjecting the gas to an absorption treatment with a liquid absorbing medium, subjecting the charged medium from the absorption treatment to a preliminary distillation treatment by the application of heat, passing the liquid from the distillation treatment while hot in countercurrent flow and in direct contact with the distilled vapors and gases and passing additional hot light gas with the distilled vapors and gases in direct contact and in countercurrent flow with the liquid from the distillation treatment.

7. A process of recovering gasoline from natural gas, casinghead gas, and the like, which comprises subjecting the gas to an absorption treatment with a liquid absorbing medium, subjecting the charged medium from the absorption treatment to a preliminary distillation treatment by the application of heat, passing the liquid from the distillation treatment while hot in countercurrent flow and in direct contact with the distilled vapors and gases, and introducing hot light gas into the preliminary distillation treatment.

In testimony whereof I affix my signature.

HAROLD B. BERNARD.